Figure 1:
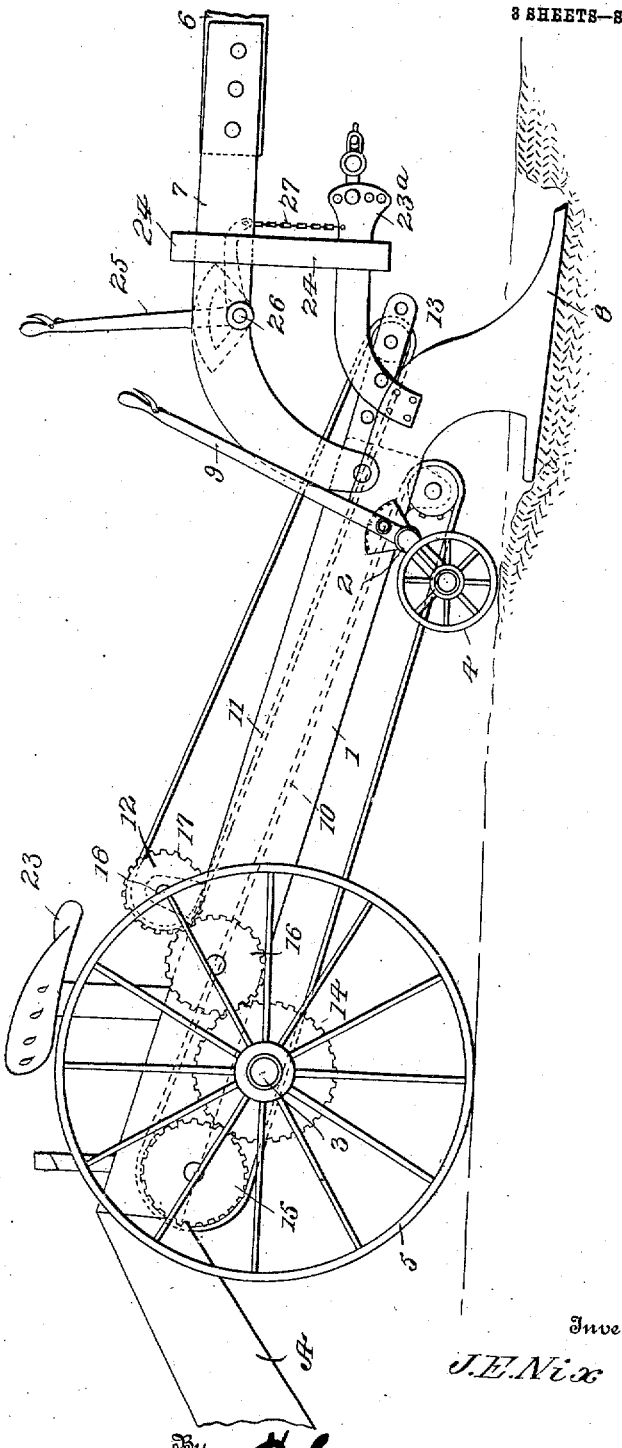

J. E. NIX.
BEET HARVESTING MACHINE.
APPLICATION FILED APR. 21, 1908.

956,821.

Patented May 3, 1910.
3 SHEETS—SHEET 1.

Witnesses

Inventor
J. E. Nix
By R. W. & R. Lacey, Attorneys

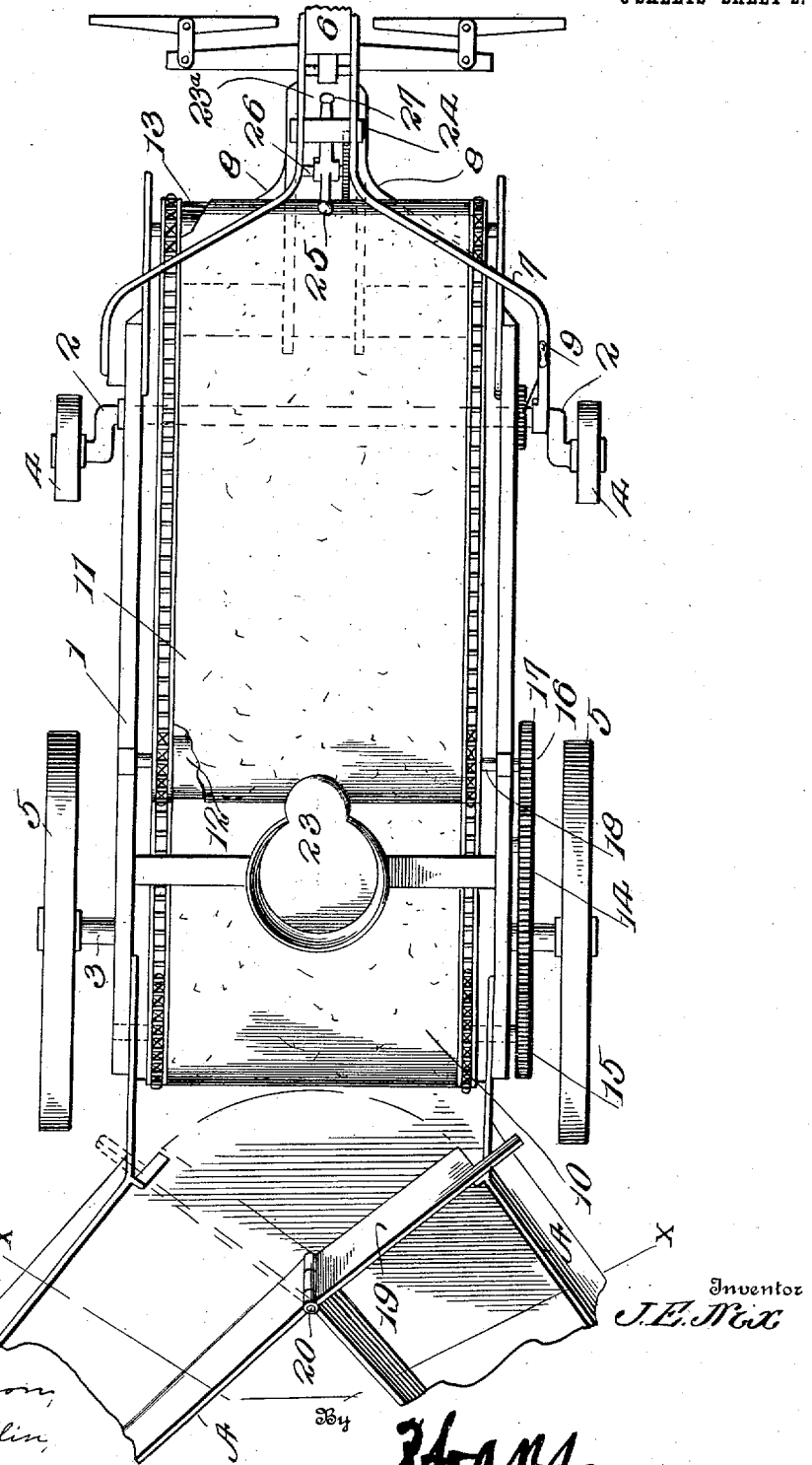

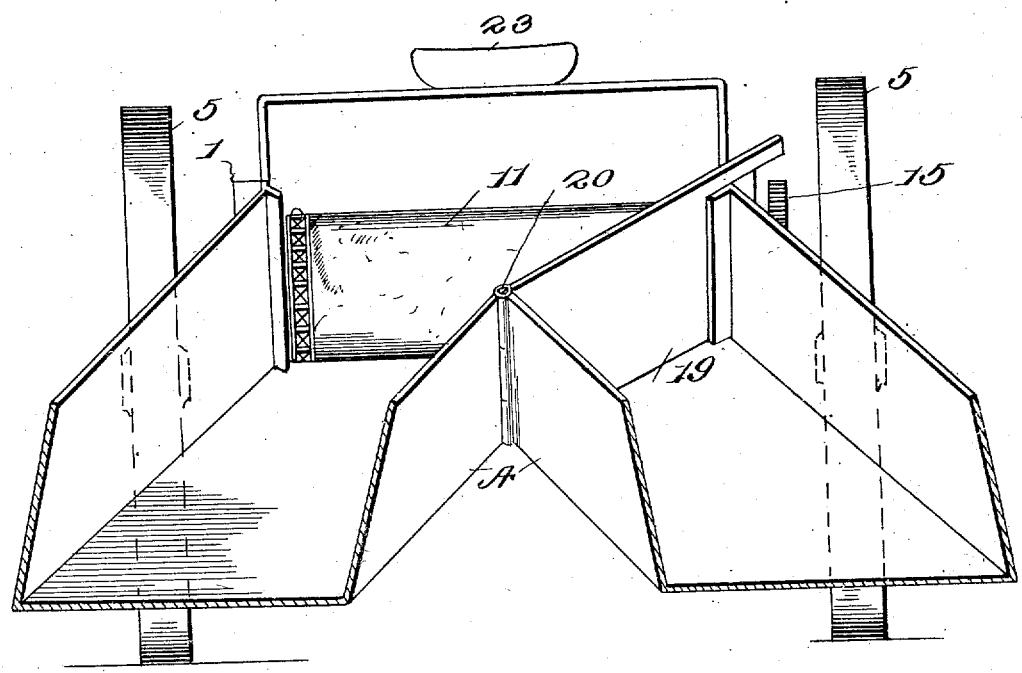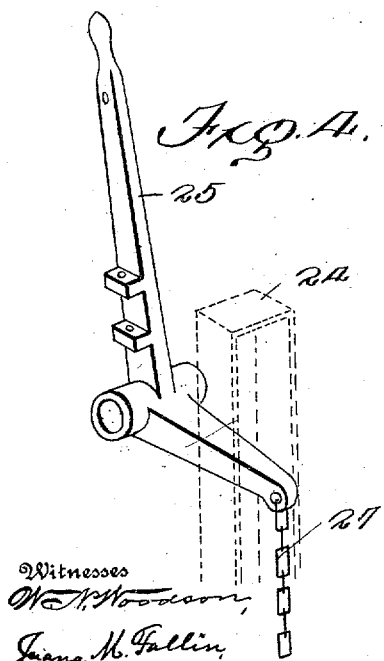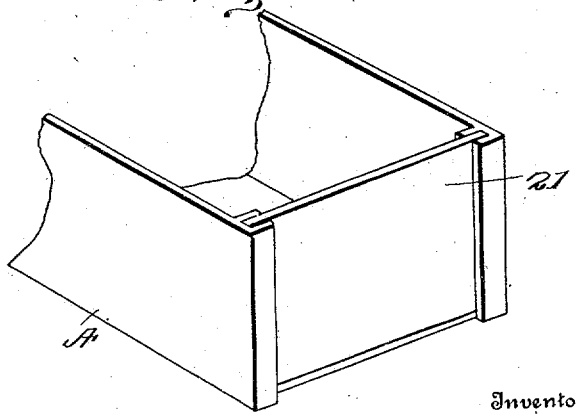

UNITED STATES PATENT OFFICE.

JOHN E. NIX, OF DESOTO, MISSOURI, ASSIGNOR OF ONE-HALF TO T. O. FAUBER, OF DESOTO, MISSOURI.

BEET-HARVESTING MACHINE.

956,821.      Specification of Letters Patent.      Patented May 3, 1910.

Application filed April 21, 1908. Serial No. 428,405.

*To all whom it may concern:*

Be it known that I, JOHN E. NIX, a citizen of the United States, residing at Desoto, in the county of Jefferson and State of Missouri, have invented certain new and useful Improvements in Beet - Harvesting Machines, of which the following is a specification.

The present invention provides a novel machine particularly designed for harvesting beets and tubers which are planted in rows, the machine lifting the beets and discharging the same in piles at one side or the other of the machine, as may be required.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a beet harvester embodying the invention. Fig. 2 is a top plan view of the machine. Fig. 3 is a transverse section on the line $x$—$x$ of Fig. 2, looking in the direction of the arrows, the front portion of the machine being omitted or broken away. Fig. 4 is a detail perspective view of the means for throwing the lifting blades out of action when it is required either to turn the machine or to back the same. Fig. 5 is a detail perspective view of the delivery end of one of the chutes.

Corresponding and like parts are referred to in the following description and indicated in all the views of the drawings by the same reference characters.

The machine embodies a suitable framework 1 mounted at its front end upon a crank axle 2 and at its rear end upon an axle 3, the front axle having crank arms at its ends whose spindles are supplied with comparatively small wheels 4. The rear axle 3 is provided with comparatively large wheels 5 with the result that the framework inclines upwardly and rearwardly. The pole or tongue 6 is connected with the front axle or framework by means of hounds 7. Lifting blades 8 are provided at the front end of the machine and are designed to extend beneath the leaves of the beets, or to penetrate the soil and lift the beets as the machine is drawn over the field. The lifting blades incline upwardly and rearwardly so as to elevate the beets and direct the same to the elevating means, whereby they are conveyed to the rear end of the machine and directed into chutes A leading rearwardly, outwardly and downwardly to discharge the beets at both or either side of the machine, as may be more convenient, or required. A lever 9 is provided for vertically adjusting the front end of the machine to regulate the depth of penetration of the lifting blades 8. It is to be understood that the adjusting means may be of any construction and relative arrangement, so long as the purpose intended is effected.

The elevating mechanism comprises a lower apron 10 and an upper apron 11, said aprons being of any construction and of the endless type so as to travel continuously. The adjacent runs or portions of the aprons travel rearwardly and the upper apron is driven at a higher speed than the lower apron so as to turn the beets and insure a loosening and removal of the earth therefrom. The upper apron 11 is mounted upon rollers 12 and 13, the latter roller being mounted to yield vertically to admit of the space between the aprons 10 and 11 automatically adjusting itself to the size of the beets passing between them. The lower apron 10 extends in the rear of the upper apron and directs the beets into the chutes A. Both aprons are driven from the axle 3 or a ground wheel 5. A gear wheel 14 either secured to the axle 3 or having connection with a ground wheel 5, is in mesh with gear wheels 15 and 16. The gear wheel 16 meshes with a gear wheel 17 fast to a shaft 18 secured to a journal of the roller 12. The gear wheel 15 is fast to a journal of the rear supporting roller of the apron 10. It is to be understood that the aprons 10 and 11 may be relatively mounted in any manner and driven so long as the upper apron travels at a higher rate of speed than the lower apron, and the adjacent portions of the aprons move rearward.

The chutes A come together at their front ends at a point corresponding with the longitudinal center of the elevating means so that the beets may be directed about equally into each. A gate 19, pivoted at 20, is adapted to be moved so as to obstruct the entrance to either chute, thereby directing the beets to the other chute when it is required to deliver the beets at one side of the machine only. The lower rear ends of the chutes are closed by gates 21. The beets may be permitted to accumulate in one or both of the chutes so as to be discharged upon the ground in a pile by opening the gates 21. A stub tongue 23$^a$ is rigidly attached to the front end of the frame 1, and its forward end is provided with a clevis to which the draft may be attached. A guide 24 embraces the front portion of the stub tongue 23$^a$ and the forward ends of the hounds 7 so as to hold said parts in proper relation. A lever 25 is pivoted at 26 to the hounds 7 and is connected by chain 27 with the front end of the stub tongue 23$^a$. Upon operating the lever 25, the stub tongue and the front end of the machine are elevated, thereby lifting the blades 8 from the ground and permitting of the machine either being turned or backed. The levers 9 and 25 are provided with the usual detent means for securing the same in an adjusted position, said means consisting of a toothed segment and a latch bolt. A cross bar is preferably secured to the frame 1 and to which is secured the driver's seat, indicated at 23.

Having thus described the invention, what is claimed as new is:

1. In a machine for harvesting beets and the like, the combination of means for lifting the beets, upper and lower endless aprons inclined upwardly and rearwardly with their opposing portions spaced apart and arranged to receive the beets between them, means for operating the endless aprons to cause their opposing portions to travel rearwardly at a variable rate of speed, the upper apron terminating short of the rear end of the lower apron and moving relatively faster than said lower apron, and a chute for receiving the beets from the aprons and directing the same to one side of the machine.

2. In a machine for harvesting beets and the like, the combination of means for lifting the beets, an endless apron arranged to receive the beets from the lifting means, a second endless apron located above the first mentioned endless apron and overhanging the lifting means and projecting forward of the lower apron, said upper apron terminating short of the rear end of the lower apron and moving relatively faster than said lower apron, and means for receiving the beets from the lower or first mentioned apron and directing the same to one side of the machine.

3. In a machine for harvesting beets or the like, the combination of means for lifting the beets, a lower endless apron arranged to receive the beets from the lifting means, an upper endless apron spaced from the lower apron and extending forward thereof to overhang the said lifting means and terminating short of the upper rear end of the lower apron, means for operating the endless aprons to cause their opposing portions to travel rearwardly at a variable rate of speed, and a chute for receiving the beets from the lower apron and directing the same to one side of the machine.

In testimony whereof I affix my signature in presence of two witnesses.

JOHN E. NIX. [L. S.]

Witnesses:
 OSCAR FAUBER,
 SAML. A. REPPY.